M. MAAG.
GEAR CUTTING MACHINE.
APPLICATION FILED DEC. 22, 1919.
Reissued July 6, 1920.
14,909.
2 SHEETS—SHEET 1.
Fig. 1,
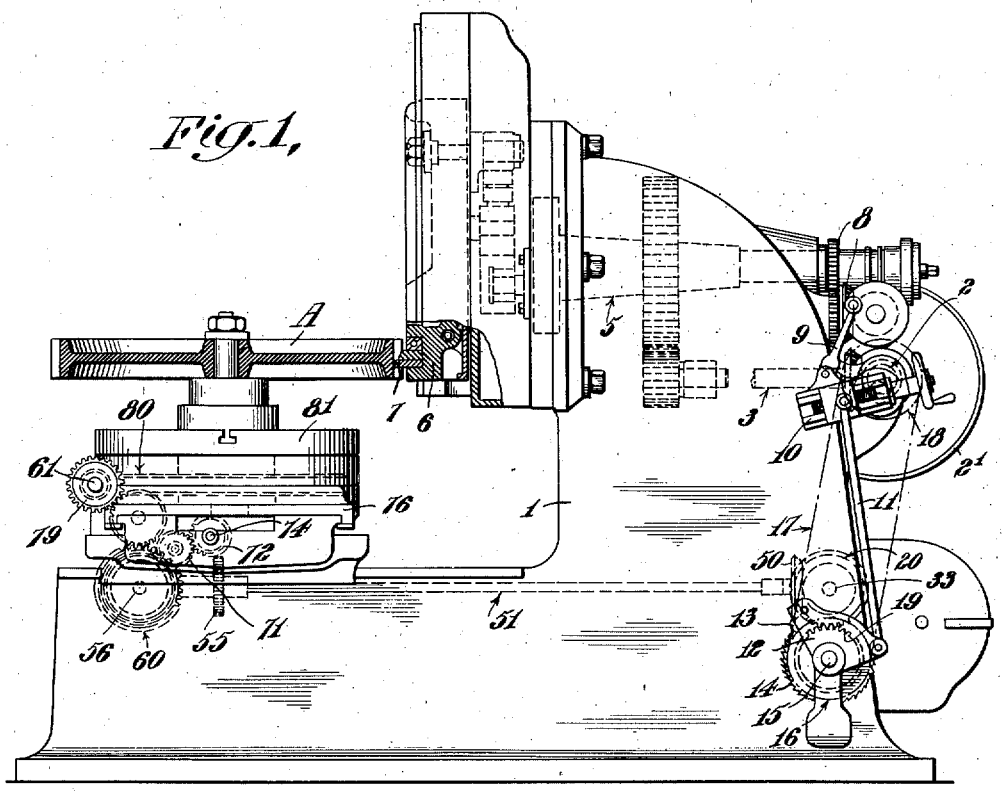
Fig. 8,
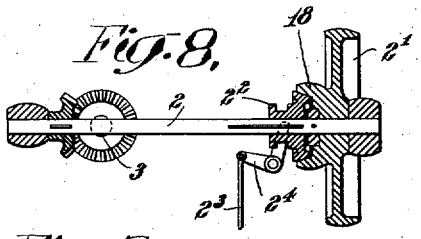
Fig. 7,
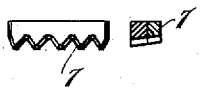
Inventor
Max Maag
By S. Jay Teller
Attorney M. MAAG.
GEAR CUTTING MACHINE.
APPLICATION FILED DEC. 22, 1919.
Reissued July 6, 1920.
14,909.
2 SHEETS—SHEET 2.
Fig. 2,
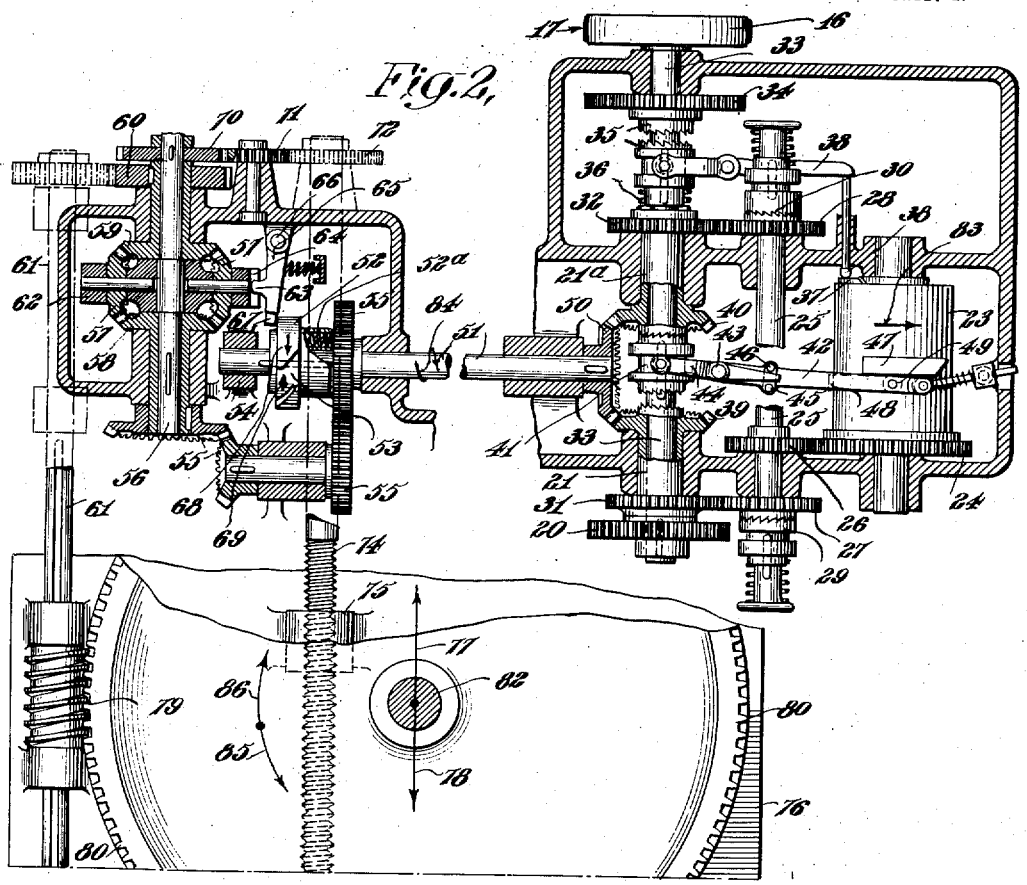
Fig. 3,
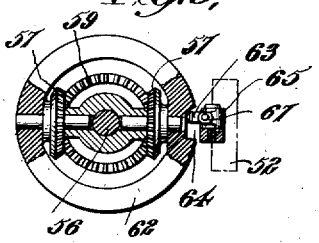
Fig. 4,
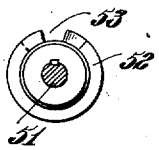
Fig. 6,
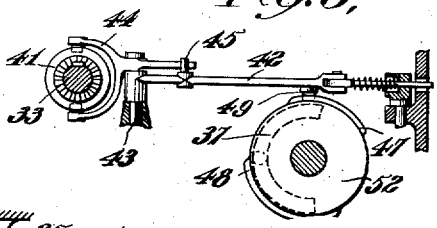
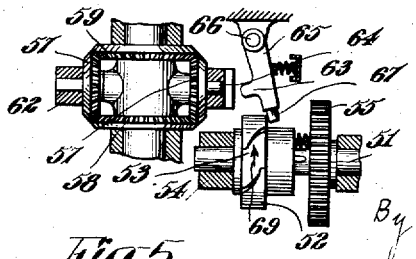
Fig. 5,
Inventor
Max Maag
By S. Jay Teller
Attorney

UNITED STATES PATENT OFFICE.

MAX MAAG, OF ZURICH, SWITZERLAND.

GEAR-CUTTING MACHINE.

14,909. Specification of Reissued Letters Patent. Reissued July 6, 1920.

Original No. 1,270,183, dated June 18, 1918, Serial No. 112,714, filed August 2, 1916. Application for reissue filed December 22, 1919. Serial No. 346,791.

*To all whom it may concern:*

Be it known that I, MAX MAAG, a citizen of the Republic of Switzerland, residing at Zurich, Hardstrasse 219, Switzerland, have invented new and useful Improvements in Gear-Cutting Machines, of which the following is a specification.

This invention relates to improvements in gear cutting machines working according to the rolling principle. The blank carrier of the machine forming the subject-matter of this invention carries out a successive rolling movement during the cutting or planing operation which is followed by a backward rolling movement, a straight return movement without rotation, and finally a return and forward rolling movement to take up the play in the driving members. These movements are controlled by a central main drum rotating continually in the same direction and by an auxiliary drum adapted to be moved in both directions. The auxiliary drum initiates the arresting and restarting of the revolving movement of the blank carrier. All the other movements of the blank carrier are controlled by the central drum.

The object of the invention is to provide means such as the aforesaid auxiliary drum for arresting and restarting the revolving movement of the carrier.

The accompanying drawings show, by way of example, one embodiment of the present invention.

Figure 1 is a front view of the machine.

Fig. 2 is a horizontal section.

Fig. 3 shows a planet gear adapted to stop and transmit a revolving movement to the blank-carrier.

Fig. 4 shows a drum for controlling the movement of the planet gear.

Fig. 5 shows the planet gear in connection with the drum controlling the movement of said gear.

Fig. 6 is a controlling mechanism actuated by the main control-drum.

Figs. 7 and 8 are details.

1 is the frame of the machine. In this frame is mounted the shaft 2 carrying the main driving disk 2′. Shaft 2 is operatively connected to a shaft 3 by means of a bevel gear. A spur gear shown in Fig. 1 in dotted lines transmits the motion of the shaft 3 to the shaft 5, while a crank drive transmits the motion of this shaft 5 to the tool carrier 6 adapted to slide in a vertical guide. 7 denotes the rack-like tool fixed in said carrier 6 (Fig. 7). The motion of the shaft 5 is also transmitted by means of toothed wheels 8 to a crank drive 9 adapted to impart an oscillating movement to a slotted piece 10. The slide moving in the slot of the piece 10 is connected to a plate 12 by means of a rod 11. The plate 12 carries a pawl 13 adapted to engage a ratchet wheel 14 loosely mounted on a shaft 15. To this shaft is fixed a pulley 16 and another pulley 18 is loose on shaft 2. A belt 17 runs over the pulleys 16 and 18. The pulley 18 is formed integral with the main driving disk 2′ and the shaft 2 is adapted to be coupled to the parts 2′, 18 by pressing a clutch member $2^2$ (Fig. 8) adapted to be moved longitudinally on the shaft 2, to which it is keyed, into a recess of the pulley 18. Such a longitudinal displacement of the member $2^2$ may be effected by pressing a lever $2^3$ upward, said lever being pivotally connected to one end of a bell-crank lever $2^4$, the other end of the latter being connected to the member $2^2$.

A toothed wheel 19 formed integral with the ratchet wheel 14 engages a toothed wheel 20 fixed to a shaft 33. 23 denotes the main control-drum provided with a spur wheel 24, which meshes with a toothed wheel 26 fixed to a shaft 25. 27 and 28 denote spur wheels, which drive the drum 23 only when the momentary direction of rotation of each of said wheels is such that the parts of the clutches 29 and 30 having oblique teeth are able to grip. The toothed wheels 27 and 28 are driven by wheels 31 and 32 respectively mounted on the shaft 33. Wheel 31 is rigidly connected to the sleeve 21 and wheel 32 to the sleeve $21^a$. During the cutting or planing operation the shaft 33 is driven by wheel 20 moved successively and slowly by the ratchet mechanism 13, 14. During the remaining time of a course of work the tool movement and the feed movement are arrested and in this case the toothed wheel 34 is driven continuously and quickly by the constantly rotating pulley 16, an intermediate gear being provided for this purpose. This wheel 34 loosely mounted on the shaft 33 is adapted to be coupled to this shaft 33 by means of a clutch 35 provided with oblique teeth. The throwing into gear of this clutch 35 is effected by the pressure exerted by a spring 36, while a cam 37 provided on an end wall of the control-drum 23 and acting by means of members 38 upon the clutch 35 effects the throwing out of gear. On the shaft 33 are further mounted loosely bevel wheels 39 and 40, wheel 39 being formed integral with sleeve 21, while wheel 40 is formed integral with sleeve 21[a]. These wheels 39, 40 are adapted to be coupled separately to the shaft 33 by means of a clutch 41 acted upon by a lever 42 pivotally mounted at 43. A fork shaped lever 44 connects the clutch 41 to the lever 42 and as one end of said lever 44 lies between two projections 45, 46 of the lever 42 the movements of the latter are transmitted to lever 44. On the circumference of the main control-drum 23 are mounted cams 47, 48 acting upon a roll 49 provided on the lever 42, so that the movement of the latter is controlled by said drum.

The rotation of the bevel wheels 39, 40 is transmitted to a bevel wheel 50 fixed to a shaft 51. The latter carries a drum 52 having a recess 53 extending from one end wall of this drum to the other one. Springs 52[a] have the tendency to press the drum 52 toward the bearing 54. The rotation of the shaft 51 is transmitted by means of toothed wheels 55 to a shaft 56. 57 denotes planet bevel wheels adapted to rotate about the shaft 56 and meshing with a bevel wheel 58 fixed to the shaft 56 and a bevel wheel 59 loosely mounted on said shaft 56. A spur wheel 60 is rigidly connected to the bevel wheel 59 and transmits the motion of the shaft 56 to a shaft 61 as soon as the ring 62 surrounding the planet wheels 57 is held stationary. This is effected from time to time by the nose 63 projecting in this case into a slot 64 (Fig. 3) of the ring 62. The nose 63 is formed integral with a lever 65 pivotally mounted on the pin 66 and carrying at its outer end a roll 67 working together with the recess 53 of the drum 52. Upon one rotation of this drum 52 in the direction of the arrow 68, and if it is assumed that roll 67 rests on that end of this drum which lies adjacent the bearing 54, the lever 65 will be oscillated in a counterclockwise direction as soon as the roll 67 enters into the recess 53, so that the nose 63 is drawn out of the slot 64 of the ring 62. Upon a rotation of the drum 52 in the direction of the arrow 69, and if is it assumed that the roll 67 is now resting on the right-hand side end of the drum 52, as shown in Fig. 5, the lever 65 is then rocked in a clockwise direction until the nose 63 enters again into the slot 64, and as this lever is then prevented from being moved farther toward the left, the drum 52 is shifted during the further movement of the roll 67 in said slot 53 toward the right against the action of the springs 52[a].

The rotation of the shaft 56 is transmitted to change wheels 70, 71, 72, the screw threaded shaft 74 and the nut 75 of the slide 76 carrying the blank A, thus causing a displacement of said slide 76 in the direction of the double arrow 77, 78.

On the shaft 61 provided with a key-way is movably mounted a worm 79 meshing with the worm wheel 80 of the table 81 carrying the blank. The table 81 is movably mounted on a gudgeon 82 of the slide 76.

The hereinbefore described machine works as follows: During the cutting or planing operation the shaft 3 is coupled to the main driving disk 2′ and the ratchet wheel 14 actuates the main control-drum 23 and the separate drum 52 and effects at the same time by means of the shaft 51 the rolling movement of the table 81 supporting the blank. Upon this successive forward movement of the table 81 follows its return movement filling up the remaining part of the course of work. This return movement consists of a short backward rolling movement I, a backward travel II without rotation corresponding to the forward travel during the cutting operation, a second short backward rolling movement III and finally a forward rolling movement IV corresponding to the sum of the two short backward rolling movements and serving to take up the play in the driving members. The continuously rotating pulley 16 actuates the members effecting the different return movements. The main control-drum 23 performs one revolution during one course of work. The cutting operation lasts 4/10 of a revolution of the main control-drum and the several return movements together 6/10, namely:

| | |
|---|---|
| Motion I | 1/20 |
| Motion II | 4/10 |
| Motion III | 1/20 |
| Motion IV | 1/10 |

Let it now be assumed, that the cutting operation just takes place. Clutch 41 works then together with the bevel wheel 40. Upon each movement of the spur wheel 20 driven by the ratchet wheel 14 the drum 23 is moved in the direction of arrow 83 as the clutch 30 is thrown into gear, while the teeth of clutch 29 slide over one another. Shaft 51 is thus rotated in the direction of arrow 84. The separate drum 52 is also rotated and is kept during this movement in its righthand end position near the spur wheel 55, while the roll 67 of lever 65 rests on the left-hand end wall of drum 52, so that the nose 63 of lever 65 projects into the slot 64 of the ring 62 and the shafts of the planet bevel wheels 57 are prevented from rotating about the shaft 56. The bevel wheel 59 is thus rotated and therefore also the shaft 61. The latter imparts thereby a rotary movement to the blank. Upon each feed movement of the shaft 51 also the wheels 70, 71, 72 are set in motion and consequently also shaft 74. The table 81 is thus rotated each time in the direction of arrow 85 and is shifted at the same time in the direction of arrow 78.

At the end of the last feeding stroke of the cutting period the cam 48 of the drum 23 presses the lever 42 and thereby also lever 44 in such a manner sidewise, that the clutch 41 disengages the bevel wheel 40 and is caused to work together with bevel wheel 39, so that the latter is coupled to the shaft 33. At the same time the lever 38 runs off the cam 37 on the drum 23, so that the clutch 35 is thrown into gear. Wheel 34 then drives the shaft 33 and the wheels 32, 28, clutch 29 and wheels 26, 24 transmit this movement to the drum 23. The coupling of the parts 41 and 39 has the effect to impart to the shaft 51 a movement in the direction opposite to the direction of the arrow 84, so that also the direction of rotation of the separate drum 52 is changed. In the meantime the roll 67, which is lying on the end wall of the drum 52 adjacent the bearing 54, moves toward the recess 53, which causes an oscillation of the lever 65 in a counter-clockwise direction, so that, when the roll 67 falls into the recess, the nose 63 is pulled out of the slot 64 of the ring 62.

This occurs just at the time, at which the main control-drum completes 1/20 of its revolution and during which the blank carrier table 81 has effected a backward rolling movement in the direction of arrow 86. As soon as the nose 63 leaves the slot 64, the ring 62 surrounding the planet wheels 57, is, however, able to rotate freely. The bevel wheel 59 and the corresponding change wheels then remain stationary and the table ceases to rotate, while the travel of the table in the direction of arrow 77 is continued during the following 4/10 of a revolution of the main control-drum 23.

During this time the roll 67 is moved again into the recess 53, the separate drum 52 being constantly rotated. As the ring 62 has just completed one revolution, the nose 63 falls again into the slot 64 arresting the ring 62. The result of this is, that the table 81 is again rotated, so that a second backward rolling movement is imparted to it lasting again 1/20 of a revolution of the main control-drum 23. After the expiration of this time the cam 47 of the main control-drum 23 pushes the levers 42 and 44 in such a manner sidewise, that the bevel wheel 39 is again uncoupled from the shaft 33, while the bevel wheel 40 is coupled to it. The shaft 51 rotates now in the opposite direction, that is in the direction of the arrow 84, so that the teeth of the clutch 29 slide again over one another, while the teeth of the clutch 30 are meshing.

It will be seen, that the main control-drum is still moved in the same direction as before. The separate drum 52 changes, however, its direction of rotation together with the shaft 51 and the roll 67 comes to rest on the end wall of the drum 52 lying adjacent the bearing 54, so that the drum 52 is shifted toward the spur wheel 55, while the nose 63 remains in the slot 64. A forward rolling movement is thus imparted to the table 81 lasting 1/10 of a revolution of the main drum 23.

The preceding backward rolling movements lasting $2 \times 1/20$ of a revolution of the drum 23 and this forward rolling movement lasting 1/10 of a revolution of said drum take up the clearance in the driving members, so that the cutting operation may now again be started. The forward rolling movement is arrested as soon as the end of cam 37 provided on the main control-drum 23 comes to lie beneath the lever 38. The latter then throws the clutch 35 out of gear and at the same time the shaft 3 is coupled to the main drive by means of members not shown in the drawings, so that the tool movement, the feeding movement, and therefore also the successive rolling movement of the table are again started.

A machine of the same general type as that herein disclosed is set forth in my Patent No. 1,290,270, dated January 7, 1919. I do not, therefore, herein present broad claims for the machine, but only claims for those features wherein the present machine differs from the machine set forth in the said patent.

What I claim is:

1. In a gear cutting machine working according to the rolling principle, in combination, a tool holder, a blank-carrier, means for moving the tool holder, and imparting to the blank-carrier a rotary movement and a longitudinal travel, said means comprising two separate drums for controlling the movements of the blank-carrier, and means actuated by one of said drums for influencing the movement of the other drum, substantially as described.

2. In a gear cutting machine working according to the rolling principle, in combination, a tool holder, a blank-carrier, means for moving the tool holder and imparting to the blank-carrier a rotary movement and a longitudinal travel, the means for moving the blank-carrier comprising two separate drums provided with cams for controlling the movements of said blank-carrier, and means controlled by one of said drums for varying the direction and the duration of rotation of the other drum, substantially as described.

3. In a gear cutting machine working according to the rolling principle, in combination, a cutting tool, a tool holder, a support for the work piece, means for moving the tool holder, a main control-drum, an auxiliary control drum, means adapted to impart a revolving movement and a longitudinal travel to the support for the work piece and actuate said main drum, the latter controlling thereby direction of said movements and means for transmitting the movement of the main drum to the auxiliary drum and adapted to rotate the latter in both directions, while the main drum is constantly rotating in the same direction, substantially as described.

4. In a gear cutting machine working according to the rolling principle, in combination, a tool holder, a blank-carrier, means for moving the tool holder, a main control-drum, an auxiliary control-drum, means adapted to impart a rotary movement and a longitudinal travel to the blank-carrier and actuate said main drum, the latter controlling thereby the direction of said movements, means for transmitting the movement of the main drum to the auxiliary drum, and means effecting at determined intervals in connection with the auxiliary drum an arresting and restarting of the rotary movement of the blank-carrier without influencing the straight, longitudinal travel of said blank-carrier, substantially as described.

5. In a gear cutting machine working according to the rolling principle, in combination, a tool holder, a blank-carrier, a main drive, means actuated by the latter for moving the tool holder, a main control-drum, an auxiliary control-drum, means actuated by the main drive for moving said drums and imparting to the blank-carrier a rotary movement and a longitudinal travel, these means being actuated at different speeds during the cutting operation and the return movement of said blank-carrier, and means actuated by said main control-drum for controlling the movement of the auxiliary drum, substantially as described.

6. In a gear cutting machine working according to the rolling principle, in combination, a cutting tool, a tool holder, a support for the work piece, a main driving member, means actuated by the latter for moving the tool holder, an auxiliary shaft, means adapted to transmit the movement of said main driving member at different speeds to said auxiliary shaft, a main control-drum, means for transmitting the motion of said auxiliary shaft to this drum, a second auxiliary shaft, an auxiliary control-drum mounted on this shaft, means for transmitting the motion of the first auxiliary shaft to the second one, means controlled by the main drum for changing the direction of rotation of the second auxiliary shaft, and gears driven by the second auxiliary shaft imparting a rotary movement and a longitudinal travel to the support for the work piece, substantially as described.

7. In a gear cutting machine working according to the rolling principle, in combination, a cutting tool, a tool holder, a support for the work piece, a main driving member, means actuated by the latter for moving the tool holder, an auxiliary shaft, a spur wheel loosely mounted on the latter and a spur wheel fixed to the auxiliary shaft, means adapted to transmit the motion of said main driving member at one speed to said fixed wheel and at another speed to said loosely mounted wheel, a main control-drum, two gears each provided with a clutch adapted to transmit the motion of said auxiliary shaft to the control-drum, two bevel wheels loosely mounted on said auxiliary shaft, a sliding clutch member fixed to the latter and mounted between said two bevel wheels, a second auxiliary shaft, an auxiliary control-drum fixed thereto, a bevel wheel fixed to the second auxiliary shaft and meshing with the two first mentioned bevel wheels, a movable member controlled by the main drum adapted to move said clutch member mounted on the first mentioned auxiliary shaft into gear with one of the bevel wheels mounted on the latter shaft, means controlled by the main control-drum adapted to rigidly connect said spur wheel to the last mentioned auxiliary shaft and gears driven by the second auxiliary shaft imparting a rotary movement and a longitudinal travel to the support for the work piece, substantially as described.

8. In a gear cutting machine working according to the rolling principle, in combination, a cutting tool, a tool holder, a support for the work piece, a main control-drum, an auxiliary control-drum, a shaft carrying the auxiliary drum and rigidly connected thereto, means for driving the drums, means adapted to so control the motion of the auxiliary drum by the main drum, that the auxiliary drum is rotated in two directions, while the main drum is constantly rotating in the same direction, a worm, a gear adapted to drive said worm, means transmitting the motion of the worm to the support for the work piece, a screw threaded shaft working together with a screw threaded part of said support, a gear for driving the screw threaded shaft, means adapted to transmit the motion of the shaft carrying the auxiliary drum as well to said worm and screw threaded shaft as also only to this shaft, and means for controlling these movements from the auxiliary drum, substantially as described.

9. In a gear cutting machine working according to the rolling principle, in combination, a cutting tool, a tool holder, a support for the work piece, a main control-drum, an auxiliary control-drum, a shaft carrying the auxiliary drum and rigidly connected thereto, means for driving the drums, means adapted to so control the motion of the auxiliary drum by the main drum, that the auxiliary drum is rotated in two directions, while the main drum is constantly rotating in the same direction, a worm, a screw threaded shaft working together with a screw threaded part of said support, a gear adapted to transmit the motion of the shaft carrying the auxiliary drum to said screw threaded shaft, a second gear actuated by the last mentioned gear and driving said worm, said second gear comprising two bevel wheels and a planet bevel gear working together with these two bevel wheels, and a locking device controlled by the auxiliary drum acting together with the planet gear, the arresting of the latter causing a rotation of the worm, which is then held stationary as soon as the planet gear is released, substantially as described.

10. An automatic gear cutting machine comprising in combination, a blank-carrier, a tool holder normally reciprocating in a fixed path and adapted to hold a cutter of the rack type, mechanism operable by a single reversible shaft for simultaneously turning the carrier forward and for moving it rectilinearly forward whereby a forward rolling movement is effected and for reversing the said movements whereby backward rolling is effected, means operable by the said shaft for interrupting the backward turning by an amount equal to an integral number of pitches, and means for interrupting the normal operation of the tool holder in relation to the blank-carrier at the end of each forward rolling movement and for starting the said normal operation after the beginning of each succeeding forward rolling movement.

11. An automatic gear cutting machine comprising in combination, a blank-carrier, a tool holder normally reciprocating in a fixed path and adapted to hold a cutter of the rack type, a carriage for the blank-carrier adjustable toward and from the tool holder, mechanism operable by a single reversible splined shaft for simultaneously turning the carrier forward and for moving it rectilinearly forward whereby a forward rolling movement is effected and for reversing the said movements whereby backward rolling is effected, means operable by the said shaft for interrupting the backward turning by an amount equal to an integral number of pitches, and means for interrupting the normal operation of the tool holder in relation to the blank carrier at the end of each forward rolling movement and for starting the said normal operation after the beginning of each succeeding forward rolling movement.

12. An automatic gear cutting machine comprising in combination, a blank-carrier, a tool holder normally reciprocating in a fixed path and adapted to hold a cutter of the rack type, mechanism operable by a single reversible shaft for simultaneously turning the carrier forward and for moving it rectilinearly forward whereby a forward rolling movement is effected and for reversing the said movements whereby backward rolling is effected, means automatically operable by the reversal of the said shaft for interrupting the backward turning by an amount equal to an integral number of pitches, and means for interrupting the normal operation of the tool holder in relation to the blank-carrier at the end of each forward rolling movement and for starting the said normal operation after the beginning of each succeeding forward rolling movement.

13. An automatic gear cutting machine comprising in combination, a blank-carrier, a tool holder normally reciprocating in a fixed path and adapted to hold a cutter of the rack type, mechanism including a screw and a worm for turning the blank-carrier and for moving it rectilinearly whereby a forward or backward rolling movement is effected, a single shaft for operating the said screw and worm, means operable by the said shaft for interrupting backward turning of the worm to a predetermined extent, and means for interrupting the normal operation of the tool holder in relation to the blank-carrier at the end of each forward rolling movement and for starting the said normal operation after the beginning of each succeeding forward rolling movement.

14. An automatic gear cutting machine comprising in combination, a blank-carrier, a tool holder normally reciprocating in a fixed path and adapted to hold a cutter of the rack type, mechanism including a screw and a worm for turning the blank-carrier and for moving it rectilinearly whereby a forward or backward rolling movement is effected, a single shaft for operating the said screw and worm, means operable by the said shaft and comprising planetary gearing for interrupting backward turning of the worm to a predetermined extent, and means for interrupting the normal operation of the tool holder in relation to the blank carrier at the end of each forward rolling movement and for starting the said normal operation after the beginning of each succeeding forward rolling movement.

In testimony whereof I hereunto affix my signature.

MAX MAAG.